H. R. KROHN.
TANK.
APPLICATION FILED AUG. 31, 1920.
1,361,591.
Patented Dec. 7, 1920.
2 SHEETS—SHEET 2.
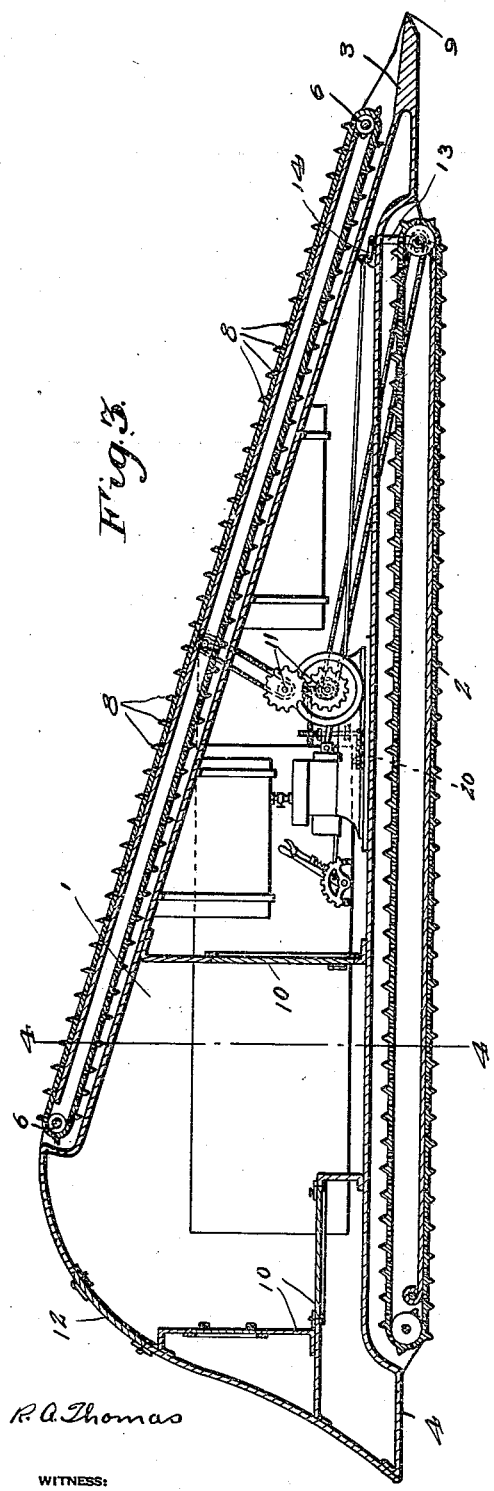
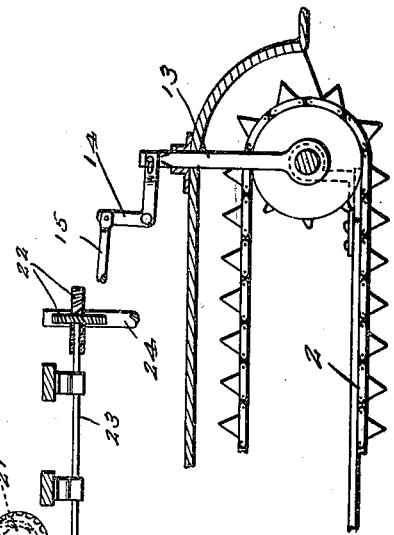
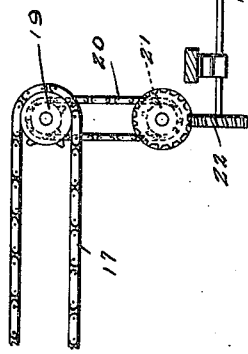
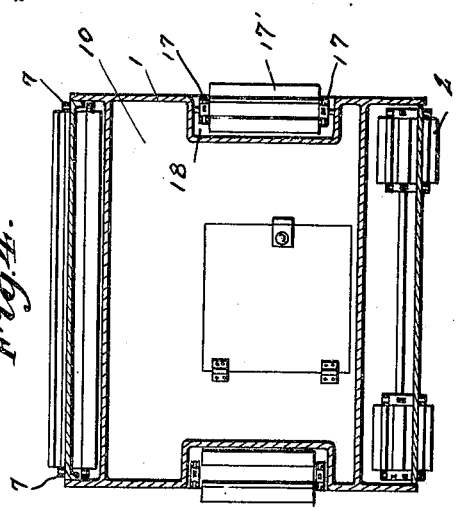
H. R. Krohn, INVENTOR

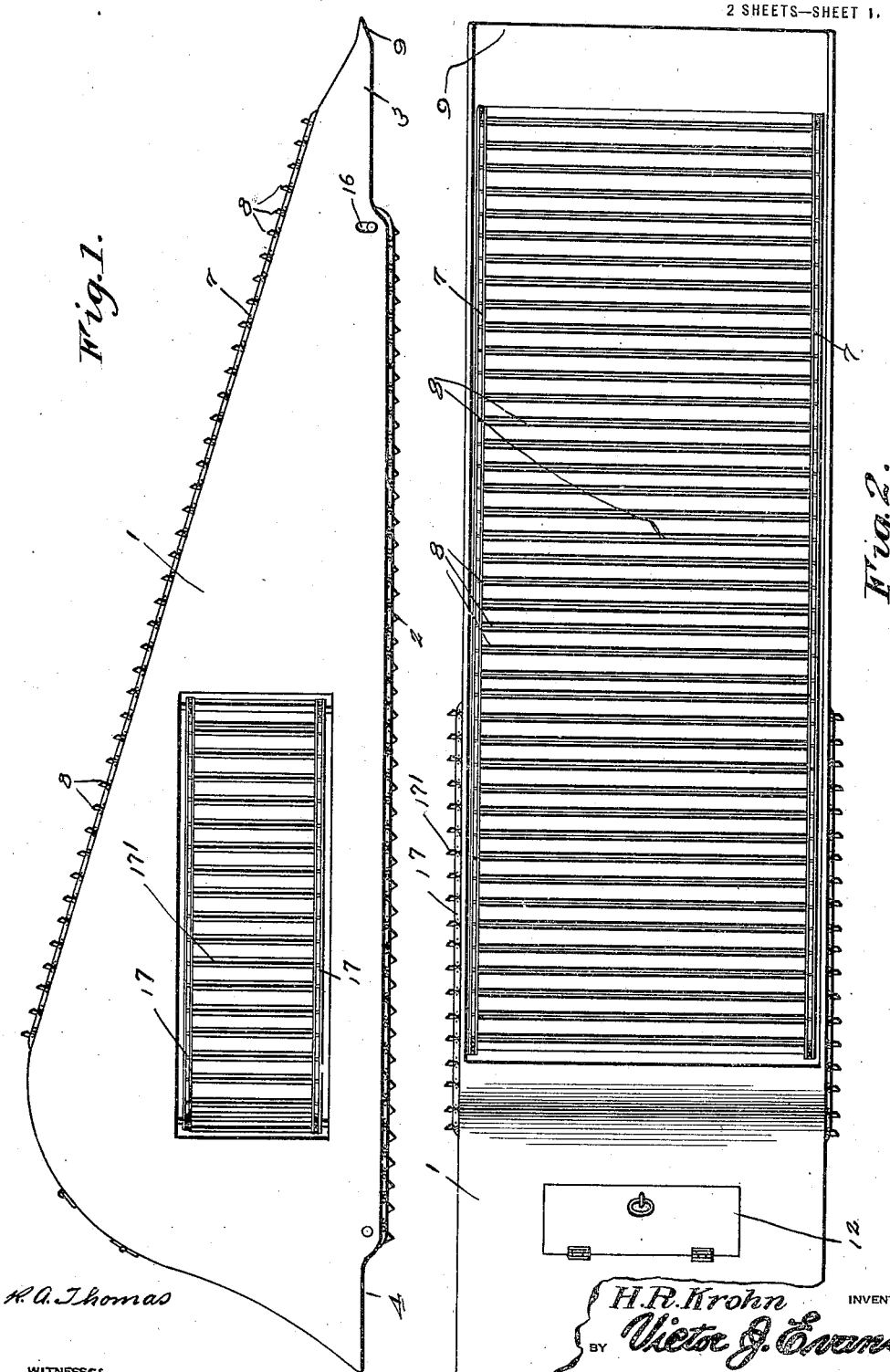

UNITED STATES PATENT OFFICE.

HERSCHEL R. KROHN, OF WIGGINS, MISSISSIPPI.

TANK.

1,361,591.          Specification of Letters Patent.       Patented Dec. 7, 1920.

Application filed August 31, 1920. Serial No. 407,144.

*To all whom it may concern:*

Be it known that I, HERSCHEL R. KROHN, a citizen of the United States, residing at Wiggins, in the county of Stone and State of Mississippi, have invented new and useful Improvements in Tanks, of which the following is a specification.

This invention relates to a movable fort usually referred to as a "tank," the principal object of the invention being to provide means whereby the tank may cut its way through the ground as it moves along, thus being hidden from the enemy and protected from his shells.

Another object of the invention is to provide means for carrying the dirt over the tank and to the rear thereof so that the dirt will be out of the way of the forwardly moving tank.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the tank.
Fig. 2 is a plan view.
Fig. 3 is a longitudinal sectional view.
Fig. 4 is a section on line 4—4 of Fig. 3.
Figs. 5 and 6 are detail views.

As shown in these views 1 indicates the body of the tank which is supported on the endless chain traction means 2 which may be of any desired type. The body has its top inclining upwardly from the wedge-shaped front and at the rear the body curves downwardly and rearwardly to the overhanging lower part 4. Rollers 6 are rotatably mounted on the inclined upper side and endless chains 7 pass over these rollers and carry the cutting and conveying teeth 8 whereby the dirt is cut away from in front of the tank and carried up the inclined part thereof to the rear where it will pass over the rear end and deposit it to the rear of the tank. The wedge-shaped part 3 ends in a cutting edge 9 which is adapted to penetrate the dirt and bring the cutting teeth into contact with the wall of the dirt in front of the tank. The interior of the body is divided by the partitions 10 into compartments for receiving the motors, the fuel and water supplies, the bombs and some of these compartments act as quarters for the crew. The driving wheels for the traction means and for the endless chains 7 are connected with the drive shaft of the motors by the shafting and gears shown at 11. The rear end of the tank is provided with an opening which is adapted to be closed by the door 12.

The front supporting axle of the traction means is adapted to be adjusted vertically so that the front wedge-shaped end of the tank may be lowered or raised to cause the tank to travel in a horizontal or an inclined plane. Such means are shown in detail in Fig. 6 and consists of the vertically movable members 13 having bearings at the lower ends for the ends of the front axle of the traction means. These members are moved vertically by means of bell cranks 14 and the links 15 which are connected with suitable levers or the like for permitting the members 13 to be moved vertically when desired to adjust the front axle to lower or raise the front end of the tank. The ends of the front axle pass through slots 16 formed in the sides of the body.

The device may be steered by holding the creeper device 2 at one side of the tank stationary while the other is being moved as is now done with the creeper type of tractors. However, when the device is in the trench I prefer to steer it by means of the endless belts or chains 17 carried by the sides of the body. These belts or chains carry projections 17' for engaging the walls of the trench. These steering means are located in recesses 18 formed in the sides of the body and the endless belts pass over vertically arranged rollers in said recesses. Each steering device is independently movable from the other device and the means for moving said devices from the engine are shown in Fig. 5 which shows one of the rollers 19 for the endless chain as being driven through means of the endless chain 20, sprockets 21, and gears 22 and shafting 23 with a shaft 24 which is suitably driven by the engine.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a body having a wedge-shaped front end and an upwardly inclined top, chain traction means for said body, endless chains supported on the said inclined top, cutting teeth on said chains and means for driving said chains and traction means.

2. An apparatus of the class described comprising a body having a wedge-shaped front end and an upwardly inclined top, chain traction means for said body, endless chains supported on the upper inclined portion, cutting and conveying teeth on said chains, a cutting edge at the front of the body and means for actuating the endless chains and the traction means.

3. An apparatus of the class described comprising a body having a wedge-shaped front end and an upwardly inclined top portion, endless chains on said top portion, cutting and conveying teeth on said chains, chain traction means, a motor within the body, means for driving the endless chains and the traction means from said motor and steering means for the apparatus.

In testimony whereof I affix my signature.

HERSCHEL R. KROHN.